Inventor
Gustav Steinlein

Patented May 31, 1938

2,119,121

UNITED STATES PATENT OFFICE 2,119,121

TWO-STROKE COMBUSTION ENGINE

Gustav Steinlein, Mainberg, near Schweinfurt, Germany

Application December 7, 1935, Serial No. 53,307
In Germany December 8, 1934

4 Claims. (Cl. 123—65)

The invention relates to two-stroke combustion engines and more particularly to the scavenging operation thereof whereby the products of the previous combustion are expelled by the admitted fresh charge of pre-compressed mixture.

The object of the invention is to avoid the well known whirl preferably generated in or below the head of the working cylinder by the stream or streams of the scavenging agent, burnt gases enclosed in said whirl being retained in the cylinder and mixed with the fresh charge thereby impairing the subsequent combustion.

This object is attained by the provision of means capable of admitting two diametrically oppositely entering scavenging streams which during the scavenging and charging period gradually increase their inclination towards each other and the axis of the working cylinder; thus they first pass directly towards the dome-like cylinder head where they are broken and turned off to the cylinder axis in counterflow, mutually absorbing their kinetic energy so as to form a static condition of small local whirls therein, while in proportion as the inlet and outlet ports are uncovered by the piston the two streams are caused to converge and intersect each other in a point of the axis of the cylinder.

For this purpose guiding and deflecting faces are formed in the edge of the engine piston oppositely to two diametrically opposite and identically dimensioned admission ports, said ports and the feeding channels thereof, being inclined to the cylinder axis in such a degree that their axes intersect in a point of the axis of the cylinder in the interior of same. Moreover, the tapering guide means of the piston are still placed in front of the ports and constitute the continuation of the feed channels when the piston is at the outer or lower end of its stroke.

In the drawing, which forms a part of this specification, two embodiments of the invention are represented by way of examples.

Like reference numerals denote like parts throughout all figures of the drawing.

Figure 1:
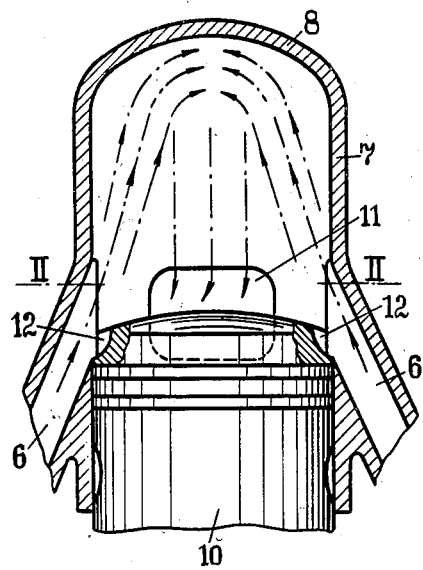
Fig. 1 is an axial sectional view of the vertical working cylinder and the inlet ports of the engine.
Figure 2:
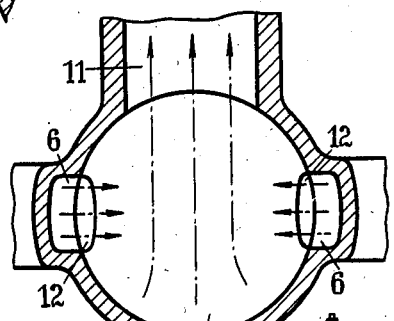
Fig. 2 represents a horizontal cross-section of the cylinder on the line II—II of Fig. 1.

In the internal combustion engine illustrated in Figs. 1 and 2 according to the invention the admission ports 6 for the scavenging gases open at acute angles relatively to the axis of the cylinder into the cylinder 7 and toward the cylinder head 8. In front of these admission ports the controlling piston 10 is at its edge provided with recesses 12 which result in different deflections of the entering gas flows, according to the particular position of the said piston (see Figs. 1 and 5). The burnt gases are caused to leave the cylinder through an exhaust port 11 disposed between the two inlet ports 6.

Figure 5:
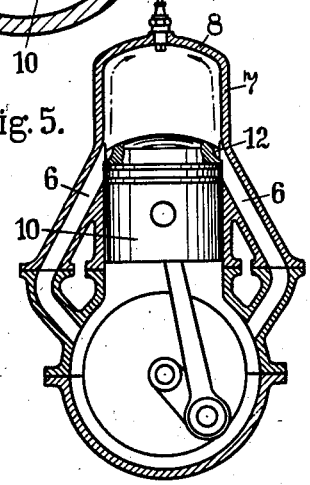
Fig. 5 is a vertical sectional view of the entire engine on a smaller scale, showing the piston in another position of its stroke.

The scavenging appliance works as follows: The streams of mixture fed to the cylinder from the crank case of the engine, as diagrammatically shown in Fig. 5, are, when the inlet ports 6 begin to open, conducted upwards by the recesses 12 of the piston 10 acting as deflecting surfaces so that the said streams are caused to flow approximately parallelly with the center line of the cylinder but, at least in the neighbourhood of the cylinder wall, towards the cylinder head 8; as they have identical velocities they will meet in the cylinder head within which they are deflected towards one another, and since their velocities compensate one another mutually, there will be produced a zone of small whirls free from flow which will urge the burnt gases downwardly. The more the piston 10 opens the inlet ports 6 more widely, the more the streams will be inclined towards one another so that they meet within the cylinder on the cylinder axis and are caused to flow against, and suppress substantial whirls, if any, previously developed within the above-mentioned zone in a downward direction, while the burnt gases still present between the convergent streams are caused to flow towards the outlet 11. On account of the acute angle of admission of the gas charge the space in the cylinder as comprised between the outlet port 11 and the opposed cylinder wall is completely free for the exhaust of the gases. This results in the advantage that the exhaust will take place with a radius of curvature larger than in the reverse scavenging methods so far known. As moreover the surface of the piston head is smooth the discharge of the burnt gases to the outlet 11 is not checked.

Figure 3:
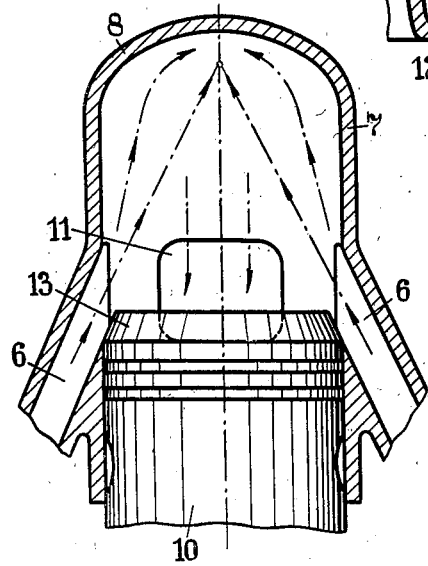
Fig. 3 is a vertical axial section of another embodiment of the invention.

As Fig. 3 shows, the head of the piston 10 may also be constructed as a short truncated cone 13 in which case parts of the convex surface of that cone in front of the ports 6 perform the conduction of the gases.

Figure 4:
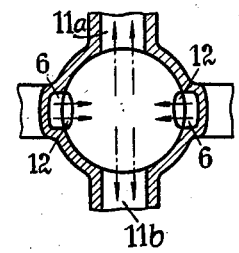
Fig. 4 represents on a smaller scale a horizontal cross-section similar to Fig. 2, showing a further modification of the engine.

In Fig. 4 two diametrically located exhaust ports 11a and 11b are represented between the inlet ports 6.

I claim:

1. In a two-stroke combustion engine, the combination with a working cylinder, of two diametrically opposite admission openings inclined to the cylinder axis and cylinder head, exhaust apertures disposed at right angles to the said admission openings, a piston reciprocating in said working cylinder, and guiding means provided at the piston edge in front of the admission openings, said guiding means being capable of directing the entering gas stream at the beginning of the scavenging period parallel with the cylinder axis and towards the cylinder head where they meet in a counter-stream, thus stopping their flow at the center of the cylinder head, and of inclining the said streams towards each other and downwardly on the continued scavenging movement of said piston to fill the lower part of the cylinder.

2. In a two-stroke combustion engine, the combination with a working cylinder, of two diametrically opposed gas admission ports, the axes of which are inclined towards each other at equal angles with respect to the cylinder axis, exhaust means between the two admission ports, a piston adapted to reciprocate in said working cylinder and having on opposite sides of the head thereof adjacent to said admission ports inclined surfaces prolonging the admission ports into the cylinder and adapted to initially direct the streams of admitted gases steeply into the cylinder head in counter-streams, and then to incline said streams towards each other during the scavenging movement of the piston until they intersect each other in a point of the cylinder axis located in the cylinder.

3. A two-stroke combustion engine, including a cylinder having a pair of diametrically opposed gas admission ports, the axes of which are inclined towards each other at equal angles with respect to the cylinder axis, exhaust means between said admission ports, and a piston adapted to reciprocate in said cylinder and provided on opposite sides of the head thereof adjacent to said admission ports with a pair of surfaces forming with the cylindrical wall substantially vertical channels open to the cylinder head, and adapted initially to direct the incoming gas streams along the cylinder wall into the cylinder head in counter streams as the admission ports are uncovered during the scavenging movement of the piston, and to vary the inclination of the two gas streams during the continued scavenging movement of the piston so that the meeting point of said gas streams moves along the axis of said cylinder and away from the cylinder head.

4. A two-stroke combustion engine including a cylinder having a pair of diametrically opposed gas admission ports, the axes of which are inclined toward each other at equal angles with respect to the cylinder axis, exhaust ports between said admission ports, and a piston adapted to reciprocate in said cylinder, and provided with a frusto-conical head forming surfaces adjacent to said admission ports adapted to initially direct the streams of admitted gases steeply into the cylinder head in two counter-streams, and then to incline said streams toward each other during the scavenging movement of the piston so that the intersecting point of the incoming streams will move along the axis of said cylinder and away from the cylinder head during said scavenging movement.

GUSTAV STEINLEIN.